United States Patent
Danilak

(10) Patent No.: US 7,480,749 B1
(45) Date of Patent: Jan. 20, 2009

(54) MAIN MEMORY AS EXTENDED DISK BUFFER MEMORY

(75) Inventor: Radoslav Danilak, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 587 days.

(21) Appl. No.: 10/857,739

(22) Filed: May 27, 2004

(51) Int. Cl.
 *G06F 5/00* (2006.01)
(52) U.S. Cl. .................................. 710/52; 710/55
(58) Field of Classification Search ............... None
 See application file for complete search history.

(56) References Cited

U.S. PATENT DOCUMENTS

| | | | | |
|---|---|---|---|---|
| 5,163,131 A | * | 11/1992 | Row et al. ............... | 395/200 |
| 5,581,736 A | * | 12/1996 | Smith ..................... | 395/497 |
| 5,682,471 A | * | 10/1997 | Billings et al. ........... | 714/15 |
| 6,003,115 A | * | 12/1999 | Spear et al. .............. | 711/137 |
| 6,389,513 B1 | * | 5/2002 | Closson .................. | 711/129 |
| 6,415,359 B1 | * | 7/2002 | Kimura et al. ............ | 711/137 |
| 6,434,553 B1 | * | 8/2002 | Sekiguchi et al. ......... | 707/4 |
| 6,549,992 B1 | * | 4/2003 | Armangau et al. ........ | 711/162 |
| 6,968,425 B2 | * | 11/2005 | Hashimoto ............... | 711/113 |
| 2003/0189860 A1 | * | 10/2003 | Takeuchi et al. .......... | 365/200 |

* cited by examiner

*Primary Examiner*—Tariq Hafiz
*Assistant Examiner*—D. P.
(74) *Attorney, Agent, or Firm*—Patterson & Sheridan, L.L.P.

(57) ABSTRACT

Methods and apparatus for using a predetermined portion of main memory as extended disk buffer memory that is used as disk buffer memory for a disk drive. A controller causes data, such as prefetched data, to flow between disk electronics and the extended disk buffer memory. Data is stored in the extended disk buffer memory along with the logical block address associated with that data and with validation information. Valid data recalled from the extended disk buffer memory can be used directly by the processor without going to the disk drive. In some embodiments the extended disk buffer memory can provide all of the disk buffer memory, while in other embodiments the extended disk buffer memory is augmented by disk drive buffer memory.

7 Claims, 4 Drawing Sheets

MAIN MEMORY AS EXTENDED DISK BUFFER MEMORY

FIELD OF THE INVENTION

This invention generally relates to computer memory. More specifically, this invention relates to using part of a computer system's main memory as extended disk buffer memory.

BACKGROUND OF THE INVENTION

Computers and other systems have used disk drives for many years to store large amounts of digital information. This is because while computers and other systems may have sufficient main memory (such as random access memory) to perform ongoing computational tasks, when storing large amounts of data, such as an operating system, application programs, or program data, a mass storage device such as a disk drive is usually required.

While there are many types of disk drives, including floppy disks and optical disks, probably the most widely used is the hard disk drive. A hard disk drive can record massive amounts of digital information on concentric memory tracks of a magnetic medium that coats one or more disks. The digital information is recorded as magnetic transitions within the magnetic medium. The disks are mounted on a spindle and turned at very high speeds by a spindle motor. Information on the disks is accessed using magnetic read/write heads located on pivoting arms that move over the disks. The read/write heads must be accurately aligned with the memory tracks to ensure proper reading and writing of digital information.

Hard disk drives require more than just mechanical components. Modern hard disk drives include sophisticated disk electronics that include an interface for receiving and transmitted signals and data from and to external devices, and a Head Disk Assembly Interface for interfacing the disk electronics to a head disk assembly. The head disk assembly includes the disks, the read/write head(s), the spindle motor that rotates the disks, a servo-operated actuator arm that moves the read/write head(s), and other disk drive components. The disk electronics also include servo drivers to move the actuator arms, motor drivers to drive the spindle motor, write drivers to drive the read/write head(s) to write data, an amplifier to amplify data being read, logic to determine where particular data is to be written to or read from, and data formatting electronics to convert incoming data to the proper format for writing and for converting outgoing data to the proper format for the external system. Generally, the disk electronics are operated under the control of a processor.

To enable higher speeds and improved performance, modern disk electronics include disk buffer memory (RAM) for temporarily storing data. For example, disk buffer memory can store data that has been read until data integrity checks have been performed to ensure that the read data is not corrupted, or until an external device calls for that data. Disk buffer memory can also be used to store both prefetched data and data that is to be written to the disk. Disk buffer memory has proven so useful that disk drive users are demanding additional memory.

While hard disk drives have proven themselves to be very useful recording devices, hard disk drive manufacturing is a highly competitive business subject to small profit margins. Adding additional disk buffer memory to the disk electronics could reduce or even eliminate that profit margin. Therefore, there is a need in the art to provide additional disk buffer memory with little or no increase in costs. While the foregoing has described a hard disk drive, the issues of costs and the benefits of disk buffer memory exist in other types of mass memory devices, specifically including optical drives. Therefore, a general method of using main memory as disk buffer memory would be useful.

SUMMARY OF THE INVENTION

Embodiments of the principles of the present invention provide for using a portion of main memory as extended disk buffer memory. In some embodiments the extended disk buffer memory can provide all disk buffer memory, while in other embodiments both extended disk buffer memory and disk drive buffer memory can be used.

Using a portion of main memory as extended disk buffer memory can reduce the cost of disk buffer memory and, at least in some embodiments, make more efficient use of existing main memory.

BRIEF DESCRIPTION OF THE DRAWINGS

The principles of the present invention can be readily understood by considering the following detailed description in conjunction with the accompanying drawings, in which.

DETAILED DESCRIPTION OF THE PREFERRED EMBODIMENTS

The principles of the present invention relate to using main memory, that is, memory external to a disk drive and readily accessible by a disk controller, as extended disk buffer memory, that is, memory used by a disk drive in its operations. Because what follows makes reference to three types of buffer memory, definitions may be helpful. Disk buffer memory is any memory that is used to temporarily store data that has been read from or will be written to a disk drive. Disk drive buffer memory is memory within the disk drive itself that is used as disk buffer memory. Extended disk buffer memory refers to a portion of main memory that is used as disk buffer memory.

Figure 1:
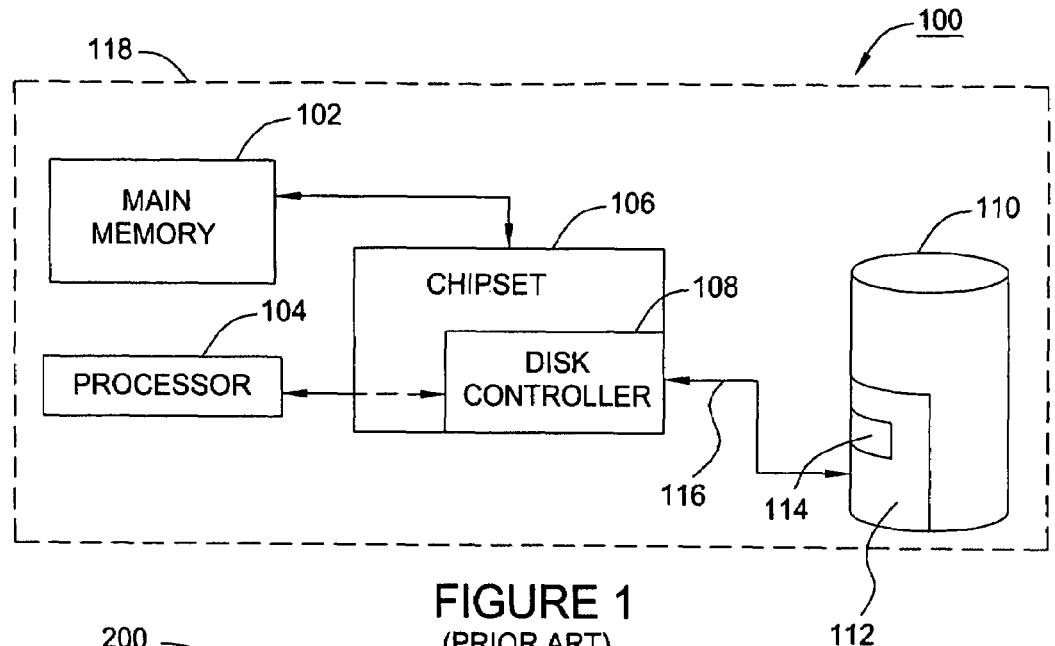
FIG. 1 illustrates a prior art system having main memory and a disk drive with disk drive buffer memory.

FIG. 1 illustrates a typical prior art system 100 that includes a main memory 102 for storing programs and data used by a processor 104. The system 100 further includes auxiliary systems that are generically shown as a chipset 106. The chipset 106 includes a disk controller 108 that controls data storage and data integration in the main memory 102 and in a disk drive 110. The disk drive 110 has disk electronics 112 that includes a disk drive buffer memory 114. Typically, the disk drive buffer memory 114 is a dynamic random access memory (DRAM) of 2 MB-8 MB that is used to temporarily store data, such as prefetched data or data that is to be written. Data is passed between the disk controller 108 and the disk electronics 112 via a bi-directional bus 116. To enable integration of the various components of the system 100, that system operates under the control of an operating system 118.

When writing data to the disk drive 110, data is sent by the disk controller 108 to the disk electronics 112. If beneficial, the disk electronics 112 will temporarily store the data in the disk drive buffer memory 114 while the drive read/write heads move into position. A read operation is similar. The disk controller 108 signals the disk electronics 112 that particular data is needed. In response, the disk electronics 112 obtains the particular data from the disk or disks of the disk drive 110, possible along with prefetched data. The obtained data is then stored in the disk drive buffer memory 114 until needed.

Figure 2:
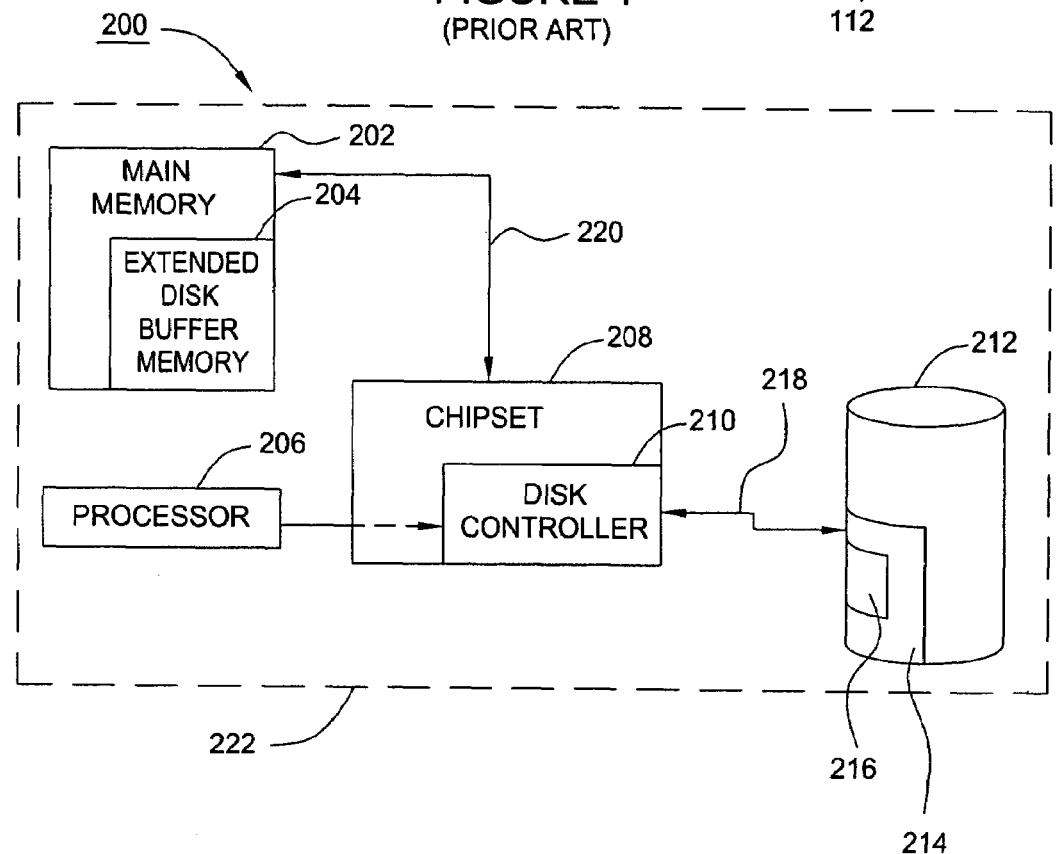
FIG. 2 illustrates a system that is in accord with the principles of the present invention and that includes main memory having a portion set aside as extended disk buffer memory, and a disk drive having limited disk drive buffer memory.

The cost of the disk drive buffer memory 114 tends to limit the amount of that memory. However, industry demands for much larger disk buffer memory, such as 16 MB and 32 MB, are increasing. FIG. 2 illustrates a system 200 that is in accord with the principles of the present invention and that provides additional disk buffer memory at little or no extra cost.

The system 200 includes a main memory 202 that stores programs and data as does the main memory 102 of FIG. 1. However, the main memory 202 includes a reserved area designated as extended disk buffer memory 204. The data in the main memory 202 is stored and recovered by a disk controller 210 in a chipset 208. The disk controller 210 also assists data integration with a disk drive 212. The disk drive 212 includes disk electronics 214 that includes disk drive buffer memory 216 (e.g. 2 MB of DRAM). Data is passed between the extended disk buffer memory 204 and the disk electronics 214 by the disk controller 210. The system 200 operates under the control of an operating system 222.

As shown in FIG. 2, a first bi-directional bus 218 connects the chipset 208 to the disk drive 212, and a second bi-directional bus 220 connects the chipset 208 to the main memory 202. In practice, data can be transferred over the second bi-directional bus 220 at a much faster rate than data can be transferred over the first bi-directional bus 218. This makes accessing data in the extended disk buffer memory 204 potentially much faster than accessing data in the disk drive buffer memory 216.

Figure 3:
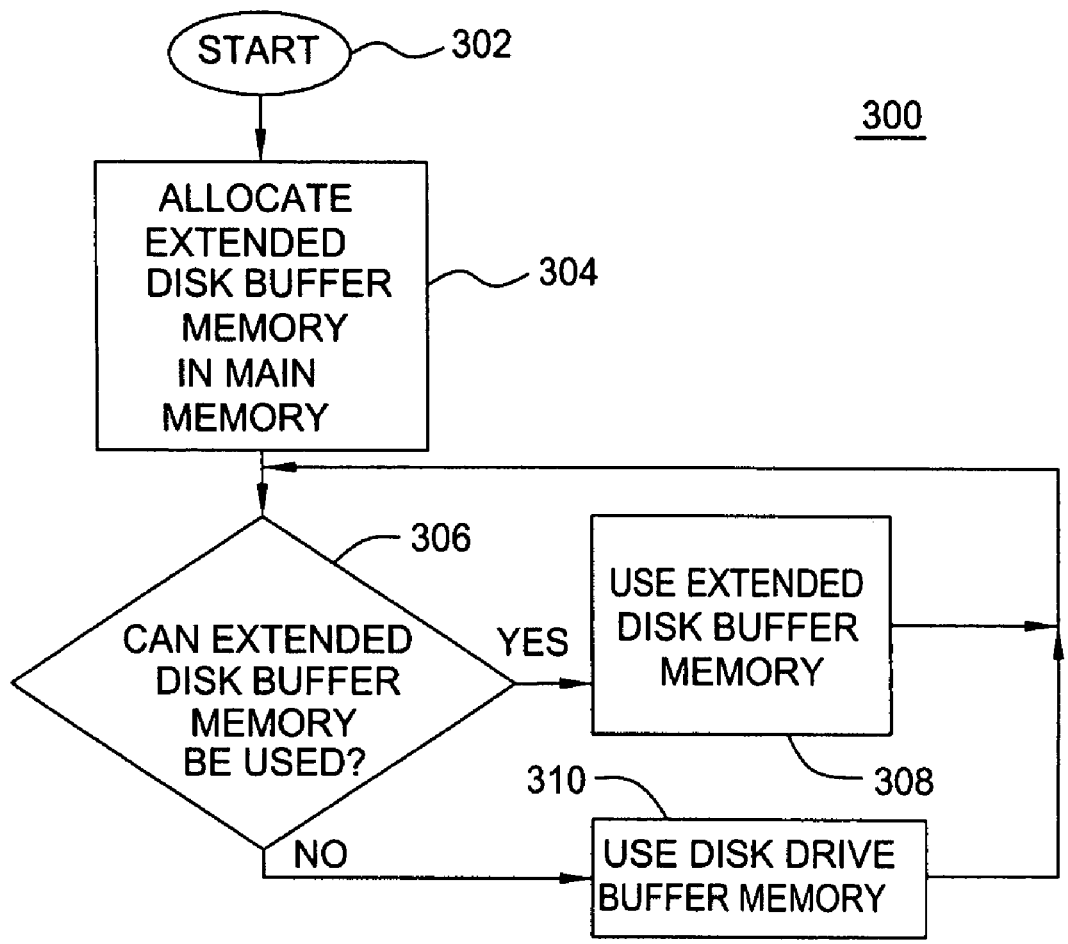
FIG. 3 illustrates a simplified method of operating the system of FIG. 2.

FIG. 3 illustrates a method 300 of operating the system 200 in accord with the principles of the present invention. The method 300 starts at step 302 and proceeds at step 304 with allocating a portion of the main memory 202 as extended disk buffer memory 204. This allocation is configurable, either pre-programmed by the operating system 222, implemented in firmware, programmed by instruction codes, set in response to switches, or in any number of other ways. Thus, the size of the extended disk buffer memory 204 can be configured to suit the particular application. In any event, a predetermined amount of main memory at reserved locations is allocated as extended disk buffer memory 204.

At step 306, when the use of disk buffer memory is required, for example when prefetched data is being stored, a determination is made as to whether the extended disk buffer memory 204 can be used. Since data transfers are much faster via the second bi-directional bus 220 than the bi-directional bus 218 it is beneficial to use the extended disk buffer memory 204 as disk buffer memory. If the extended disk buffer memory 204 is available, at step 308 the system 200 uses the extended disk buffer memory 204 as disk buffer memory.

However, if the extended disk buffer memory 204 is full or is otherwise unavailable, at step 310 the system 200 uses the disk drive buffer memory 216 as disk buffer memory. The method 300 continues looping to properly select which disk buffer memory to use.

Figure 4:
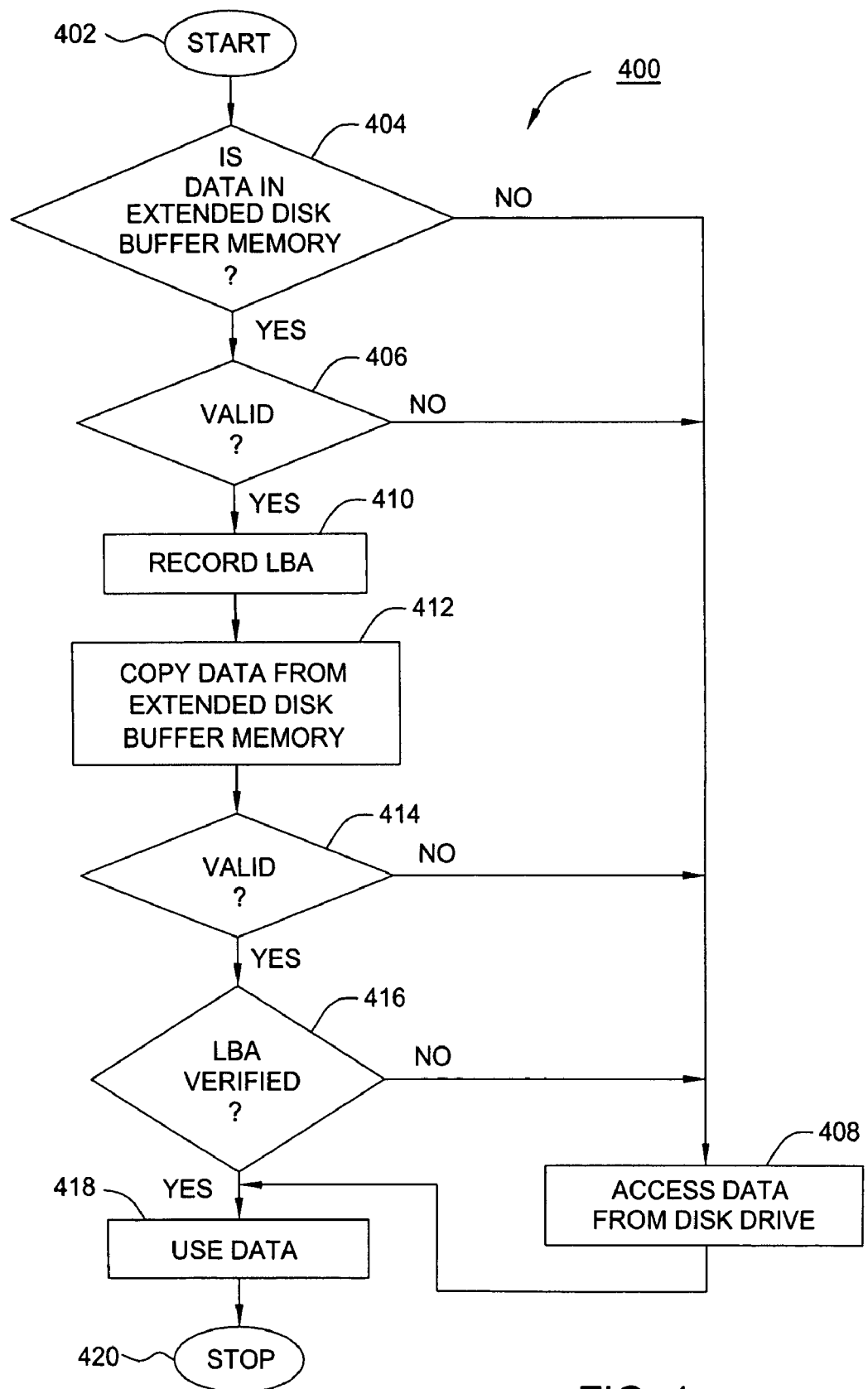
FIG. 4 illustrates an embodiment of how a processor accesses data in disk buffer memory.
Figure 5:
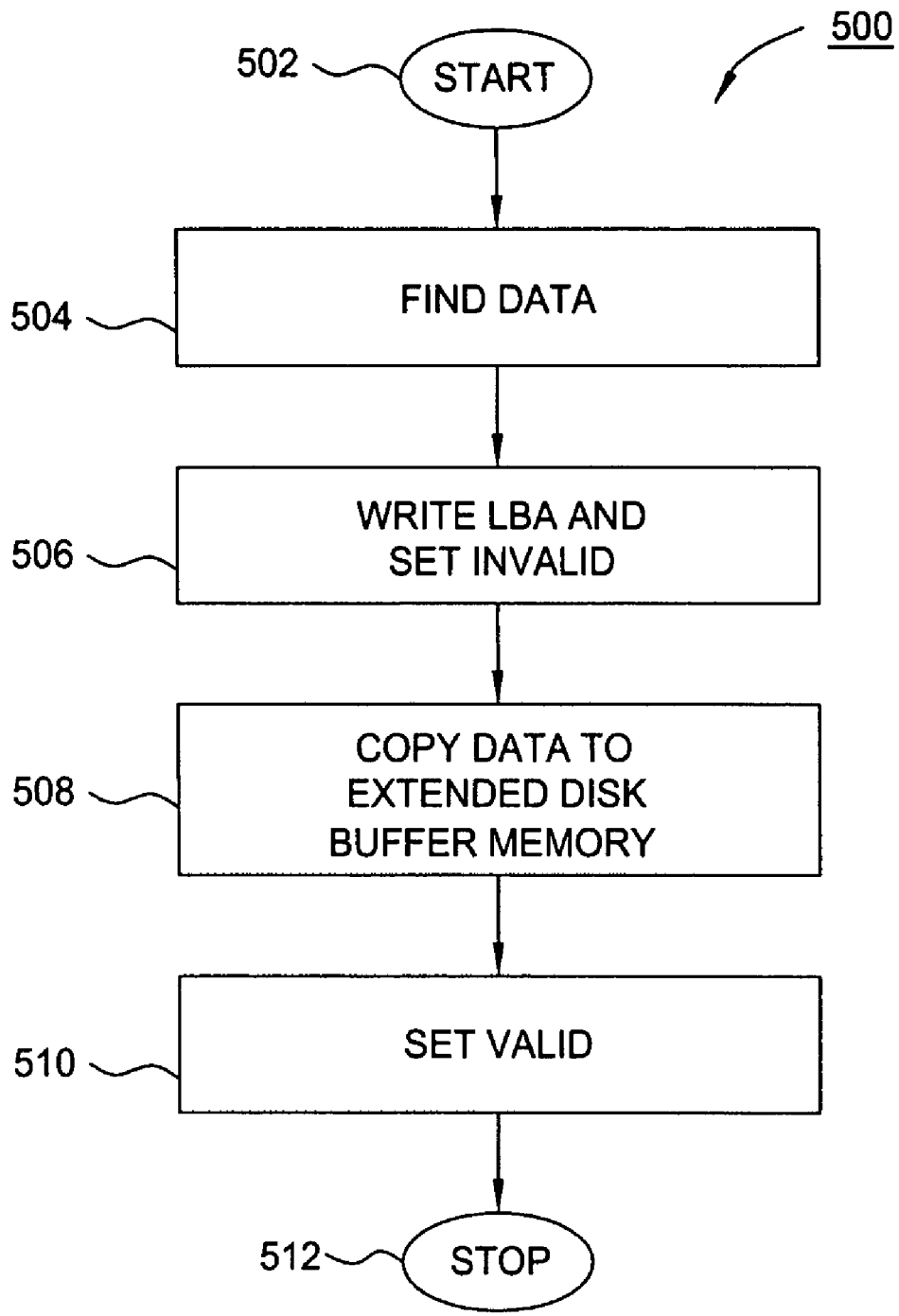
FIG. 5 illustrates an embodiment of how disk electronics writes data to the extended disk buffer memory.

When implementing the method 300, because of the fast data transfer rate of the second bi-directional bus 220 it is beneficial to directly access data from the extended disk buffer memory 204 rather than going through the disk drive 212. However, a problem could exist if the data in the extended disk buffer memory 204 is not the latest data that is available. For example, if prefetched data is stored in the extended disk buffer memory 204, and if an updated version of that data subsequently becomes available, if the prefetched data is simply recalled from the extended disk buffer memory 204 and used an incorrect result would occur. To prevent this, the system 200 operates in accord with the methods shown in FIGS. 4 and 5, where FIG. 4 represents how the processor 206 acquires data while FIG. 5 illustrates how the disk electronics 214 controls data transfers to the extended disk buffer memory 204. It should be understood that the methods shown in FIGS. 4 and 5 are interdependent. Further, that information stored in the extended disk buffer memory 204 includes not only the data itself, but that the logical block address associated with the data and an indication as to whether that data is valid are also stored. Valid and invalid data is discussed subsequently.

Referring now to FIG. 4 for a method 400 of how the processor 206 obtains data. As shown, the method 400 starts at step 402 and proceeds at step 404 with a determination as to whether data being sought by the processor 206 is in the extended disk buffer memory 204. If that data is not in the extended disk buffer memory 204, at step 408 the processor accesses the sought after data from the disk drive 212. This requires the processor 206 to communicate through the disk controller 210, across the bi-directional bus 218, and to the disk drive 212.

However, if at step 404, the sought after data is found in the extended disk buffer memory 204 (such as by using the stored logical block address), a determination is made as to whether the found data is valid by using the stored validation information. This determination relates to the actions of the disk electronics 214 invalidating data as it is being sent to the extended disk buffer memory, reference FIG. 5. Data validation and invalidation can be controlled using a flag, (say a VALID flag), a counter or a register that holds a value that depends on whether data is valid, or any other mechanism by which the disk electronics 212 can signal that data in or being sent to the extended disk buffer memory 204 is or is not valid. If the data is not valid, at step 408 the processor 206 accesses data from the disk drive 212.

However, if at step 406 the data in the extended disk buffer memory 204 is found to be valid, at step 410 the processor 206 records the logical block address of the data and at step 412 the processor 206 copies the found data from the extended disk buffer memory 204. Then, at step 414 another check is made as to whether the found data is valid. If not, the found data changed, or is in the process of changing between steps 410 and 414. Since the found data may be inaccurate, the processor 206 accesses data from the disk drive at step 408. However, if the data remains valid, at step 416 the processor 206 records the logical block address of the found data and determines if that logical block address is the same as that recorded at step 410. If the logical block addresses are not the same, the found data may not be that which was sought, for example, it may have been overwritten with other data. In that case, the processor 206 accesses the sought after data from the disk drive at step 408.

Finally, whether the processor obtains data via step 416, which means that the logical block addresses in step 416 matched, or via step 408, which means that data is obtained from the disk drive 212, at step 418 the processor 406 uses its data. Then, the method 400 stops at step 420.

FIG. 5 illustrates a method 500 used by the disk electronics 214 to store data in the extended disk buffer memory 204. The method 500 starts at step 502 and proceeds at step 504 by obtaining the data to be temporarily stored in the extended disk buffer memory 204. For example, that data can be read and prefetched data. The disk electronics 212 also obtains the logical block addresses of that data. Then, at step 506 the disk electronics 214 sends the logical block address and invalidation information to the extended disk driver buffer memory 204. The logical block address information enables the processor 206 to find sought after data in the extended disk buffer memory, while the invalidation information prevents the processor 206 from using that data before it can be safely used.

After the logical block address information and the invalidation information are sent, at step 508 the data is copied into the extended disk buffer memory 204. Then, at step 510, the disk electronics 214 send data validation information to the tended disk buffer memory 204. The method 500 then stops at step 512. By storing logical block address and validation information along with the data, and by following the method 400, the processor 206 is prevented from using data that may not be accurate.

Although the invention has been described with reference to preferred embodiments, workers skilled in the art will recognize that changes may be made in form and detail without departing from the spirit and scope of the invention. For example, the principles of the present invention can be used with systems that do not have a disk buffer memory in the disk electronics. That is, main system memory can provide all of the disk buffer memory. Thus the embodiments shown in the figures are provided by way of example only.

What is claimed is:

1. A method of operating a computer system having a processor, a disk drive including a buffer memory, and main memory, comprising the steps of:

allocating a portion of the main memory as an extended disk buffer memory for use by the disk drive;

determining if the extended disk buffer memory is available for storing prefetched disk drive data; if so, then sending and storing a data invalidation indication to the extended disk buffer memory; sending the prefetched disk drive data to the extended disk buffer memory; sending an associated logical block address with the prefetched disk drive data; and then sending a data validation indication to be stored with the prefetched disk drive data at the extended disk buffer memory, if not, then storing the prefetched disk drive data in the buffer memory; and copying the prefetched disk drive data first from the extended disk buffer memory only if the data validation indication is stored in the extended disk buffer memory, where checking for the presence of the data validation indication is performed both before and after copying the prefetched disk drive data from the extended disk buffer memory, otherwise accessing the prefetched disk drive data from the buffer memory.

2. The method of claim 1, wherein the step of copying the prefetched disk drive data from the extended disk buffer memory is performed using the logical block address.

3. The method of claim 1, wherein the step of sending data to the extended disk buffer memory includes sending an associated logical block address with the disk drive data.

4. A computer system, comprising:

a disk drive having disk electronics and a buffer memory;

a main memory having a portion reserved as an extended disk buffer memory; and a chipset including a disk controller for interfacing said extended disk buffer memory and said disk drive;

a processor for operating in accord with a program configured by the program to perform the steps of:

allocating a portion of the main memory as the extended disk buffer memory for use by the disk drive;

determining if the extended disk buffer memory is available for storing prefetched disk drive data; if so, then sending and storing a data invalidation indication to the extended disk buffer memory; sending the prefetched disk drive data to the extended disk buffer memory; then sending and storing a data validation indication to the extended disk buffer memory;

if not, then storing the prefetched disk drive data in the buffer memory; and copying the prefetched disk drive data first from the extended disk buffer memory only if the data validation indication is stored in the extended disc buffer memory, where checking for the presence of the data validation indication is performed both before and after copying the prefetched disk drive data from the extended disk buffer memory, otherwise accessing the prefetched disk drive data from the buffer memory.

5. The computer system of claim 4, wherein the step of copying the prefetched disk drive data from the extended disk buffer memory is performed using the logical block address.

6. The computer system of claim 4, wherein the step of sending data to the extended disk buffer memory includes sending an associated logical block address with the disk drive data.

7. The computer system of claim 4, further comprising a first bi-directional bus connection between the chipset and the buffer memory, and a second bi-directional bus connection between the chipset and the extended disk buffer memory, wherein data transfers along the second bi-directional bus connection are completed faster than data transfers along the first bi-directional bus connection.

* * * * *